(12) United States Patent
Negishi et al.

(10) Patent No.: US 10,461,369 B2
(45) Date of Patent: Oct. 29, 2019

(54) BATTERY AND BATTERY PACK

(71) Applicants: KABUSHIKI KAISHA TOSHIBA, Minato-ku (JP); Toshiba Infrastructure Systems & Solutions Corporation, Kawasaki-shi (JP)

(72) Inventors: Nobuyasu Negishi, Kashiwazaki (JP); Tatsuya Hashimoto, Kashiwazaki (JP); Koichi Kawamura, Fuchu (JP); Tatsuya Shinoda, Kashiwazaki (JP); Naoki Iwamura, Kashiwazaki (JP); Koichi Takeshita, Kashiwazaki (JP); Hirokiyo Mamyoda, Kashiwazaki (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 132 days.

(21) Appl. No.: 15/842,296

(22) Filed: Dec. 14, 2017

(65) Prior Publication Data

US 2018/0108949 A1    Apr. 19, 2018

Related U.S. Application Data

(63) Continuation of application No. PCT/JP2016/067686, filed on Jun. 14, 2016.

(30) Foreign Application Priority Data

Jun. 15, 2015 (JP) ................. 2015-120466

(51) Int. Cl.
*H01M 4/02* (2006.01)
*H01M 10/28* (2006.01)
(Continued)

(52) U.S. Cl.
CPC .......... *H01M 10/286* (2013.01); *H01M 2/02* (2013.01); *H01M 2/06* (2013.01); *H01M 2/20* (2013.01);
(Continued)

(58) Field of Classification Search
CPC ....................................................... H01M 4/02
See application file for complete search history.

(56) References Cited

U.S. PATENT DOCUMENTS 6,399,244 B1     6/2002  Hinotu et al.
2004/0180260 A1  9/2004  Somatomo et al.
(Continued)

FOREIGN PATENT DOCUMENTS

EP    3 101 710 A1   12/2016
EP    3 309 856 A1    4/2018
(Continued)

OTHER PUBLICATIONS

International Search Report dated Aug. 30, 2016 in PCT/JP2016/067686, filed on Jun. 14, 2016 (with English Translation).

(Continued)

*Primary Examiner* — Jacob B Marks
(74) *Attorney, Agent, or Firm* — Oblon, McClelland, Maier & Neustadt, L.L.P.

(57) ABSTRACT

According to one embodiment, a battery includes a flat-shaped electrode group, a package member and a terminal section. The package member includes a stainless steel-made first package having a flange at an opening and a stainless steel-made second package. The electrode group is stored in a space formed by welding the flange of the first package to the second package. The terminal section includes a through-hole that is open to the first package, a ring-shaped rising portion that extends from a periphery of the through-hole toward an inside of the package member, a ring-shaped member that is arranged on an outer surface of the rising portion, an insulation gasket, and an external terminal. The external terminal is fixed to the first package by caulking.

15 Claims, 17 Drawing Sheets

(51) Int. Cl.
    *H01M 2/02*    (2006.01)
    *H01M 2/06*    (2006.01)
    *H01M 2/20*    (2006.01)
    *H01M 2/26*    (2006.01)
    *H01M 2/30*    (2006.01)
    *H01M 2/34*    (2006.01)
    *H01M 10/04*   (2006.01)

(52) U.S. Cl.
    CPC .............. *H01M 2/26* (2013.01); *H01M 2/30* (2013.01); *H01M 2/34* (2013.01); *H01M 10/04* (2013.01); *H01M 10/0413* (2013.01)

(56) References Cited

U.S. PATENT DOCUMENTS

| | | | | |
|---|---|---|---|---|
| 2011/0136000 | A1* | 6/2011 | Moon | H01M 2/0285 429/163 |
| 2012/0214051 | A1 | 8/2012 | Tsukuda et al. | |
| 2016/0336554 | A1 | 11/2016 | Negishi et al. | |

FOREIGN PATENT DOCUMENTS

| | | |
|---|---|---|
| JP | 2000-285884 | 10/2000 |
| JP | 2003-142043 | 5/2003 |
| JP | 2007-179803 | 7/2007 |
| JP | 2008-192595 | 8/2008 |
| JP | 2009-48969 | 3/2009 |
| JP | 2009238421 | 10/2009 |
| JP | 2010-86785 | 4/2010 |
| JP | 2012-38522 | 2/2012 |
| JP | 2012-174451 | 9/2012 |
| JP | 2012-204013 | 10/2012 |
| JP | 2012-226836 | 11/2012 |
| JP | 2012-227026 | 11/2012 |
| JP | 2013-41788 | 2/2013 |
| WO | WO 2015/083758 A1 | 6/2015 |
| WO | WO 2015/115557 A1 | 8/2015 |

OTHER PUBLICATIONS

Written Opinion dated Aug. 30, 2016 in PCT/JP2016/067686, filed on Jun. 14, 2016.

* cited by examiner

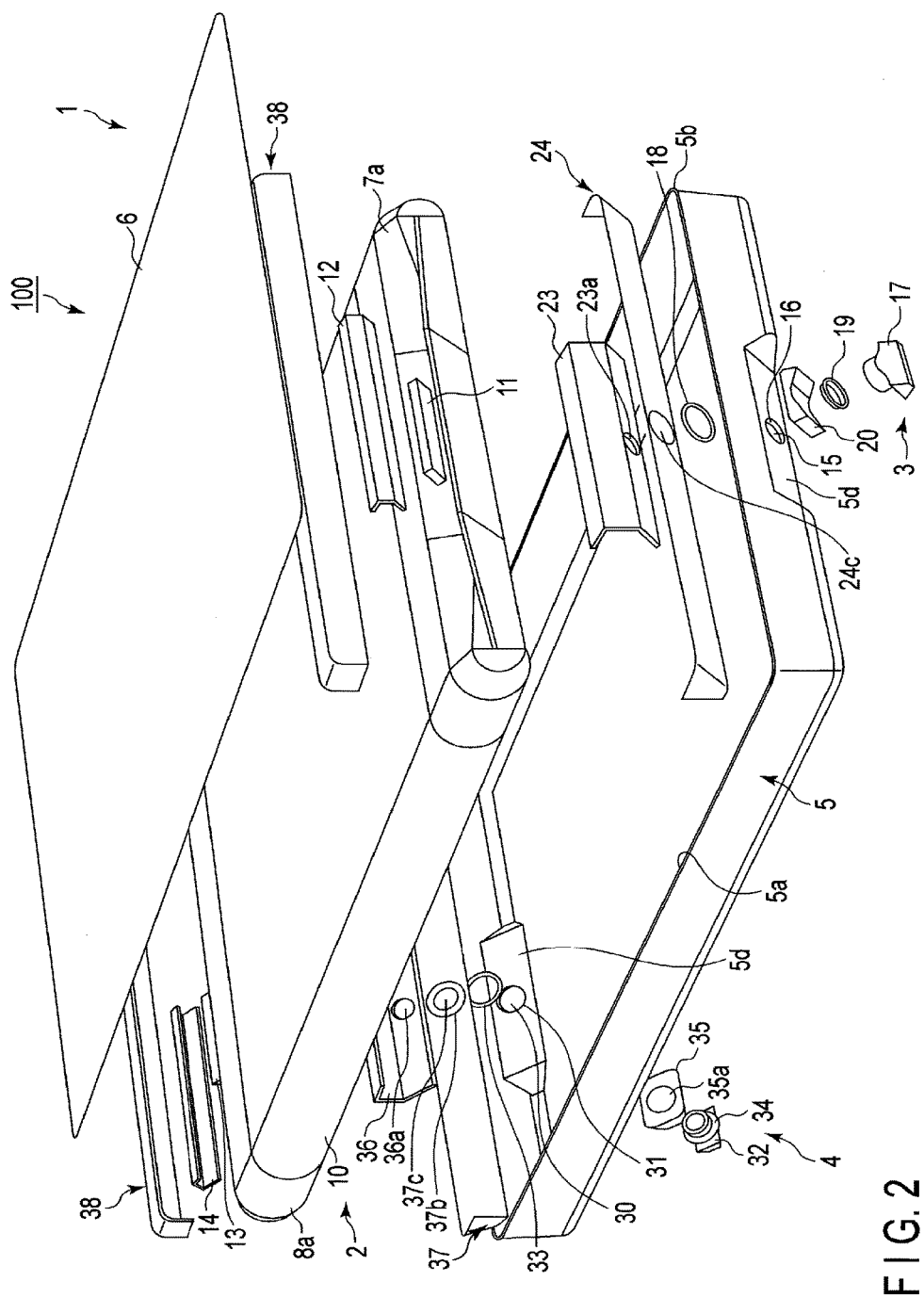
F I G. 2

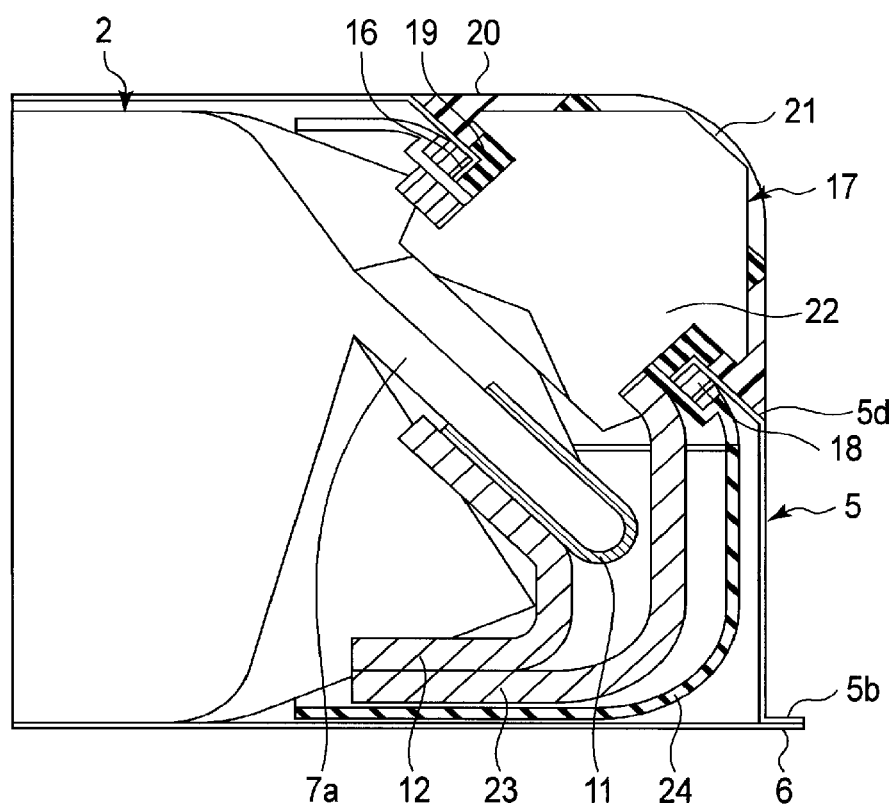
F I G. 5A

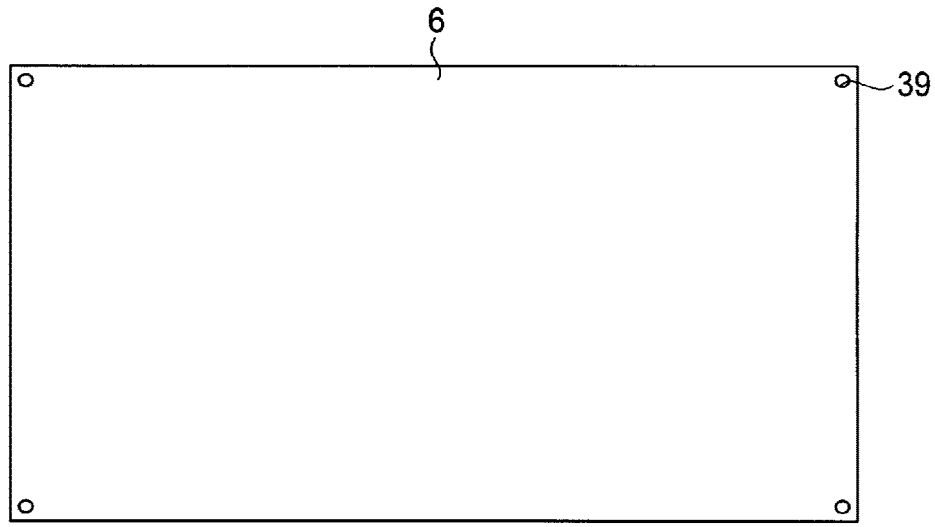
F I G. 9A
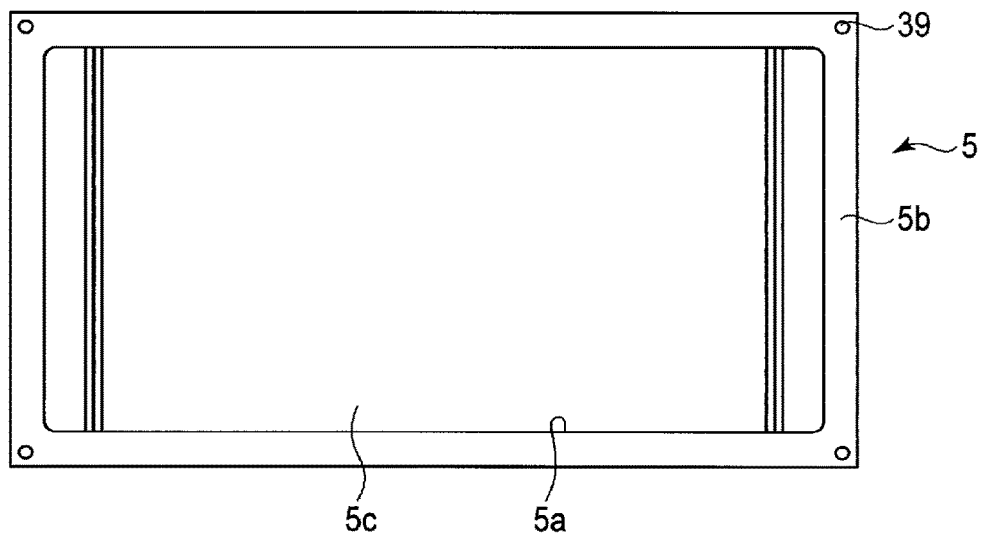
F I G. 9B

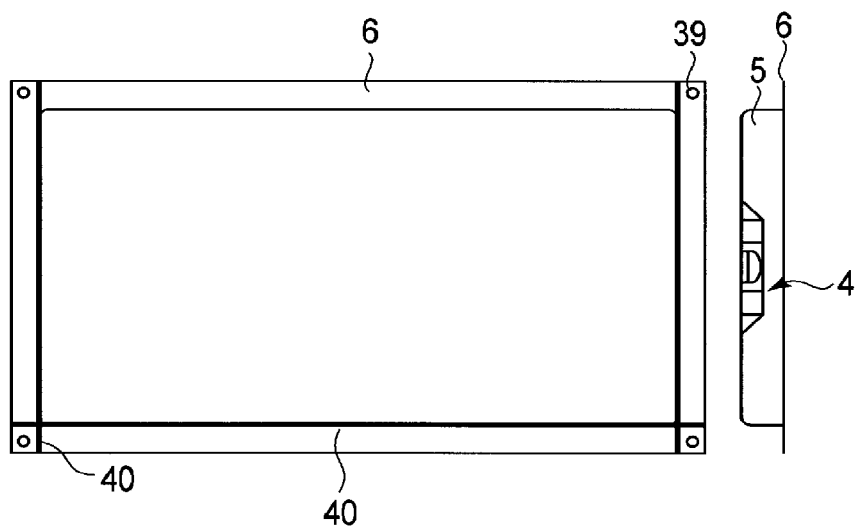
F I G. 10A
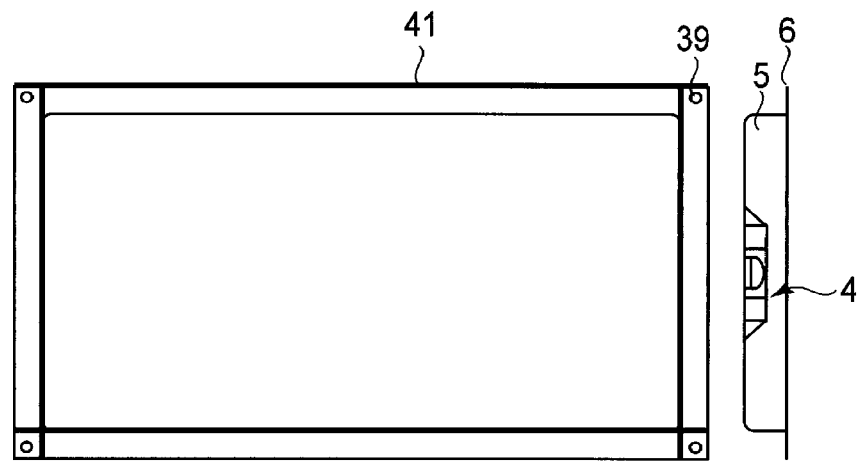
F I G. 10B

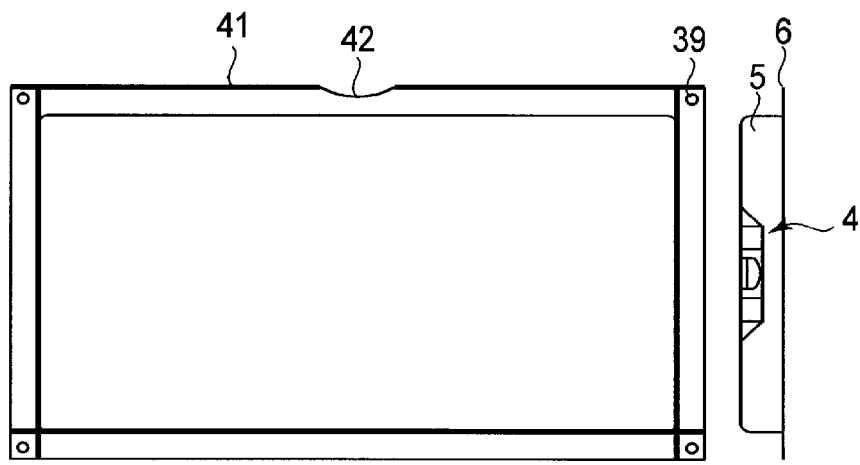
F I G. 10C
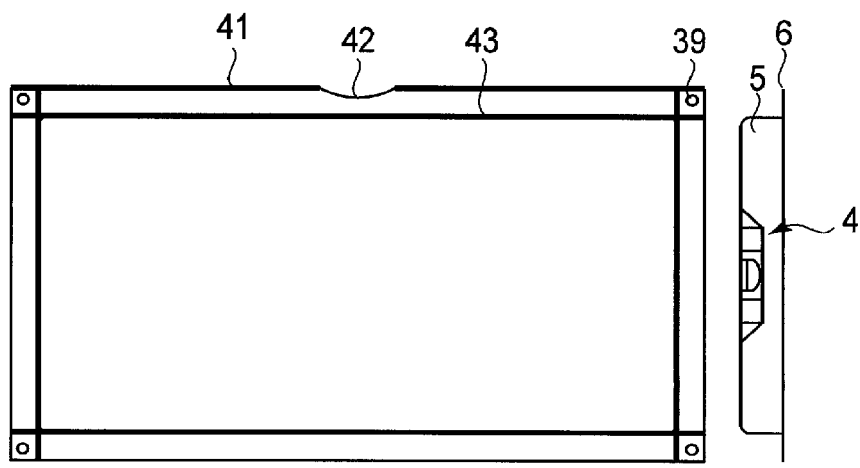
F I G. 10D

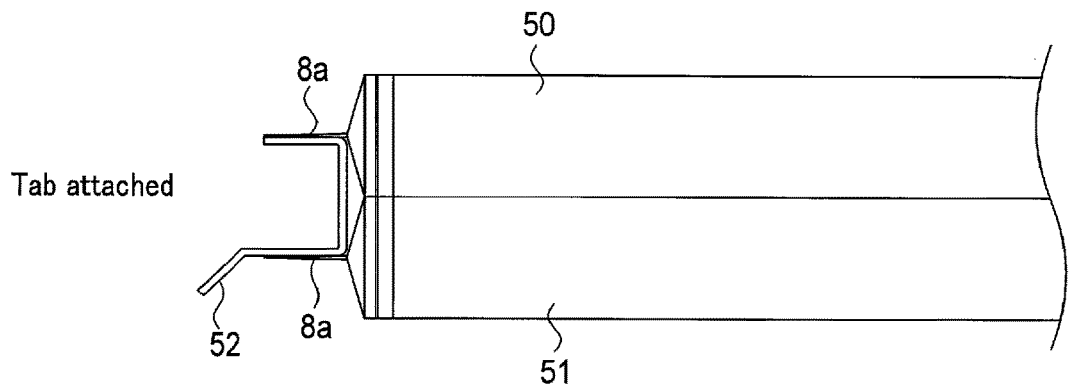
F I G. 11A
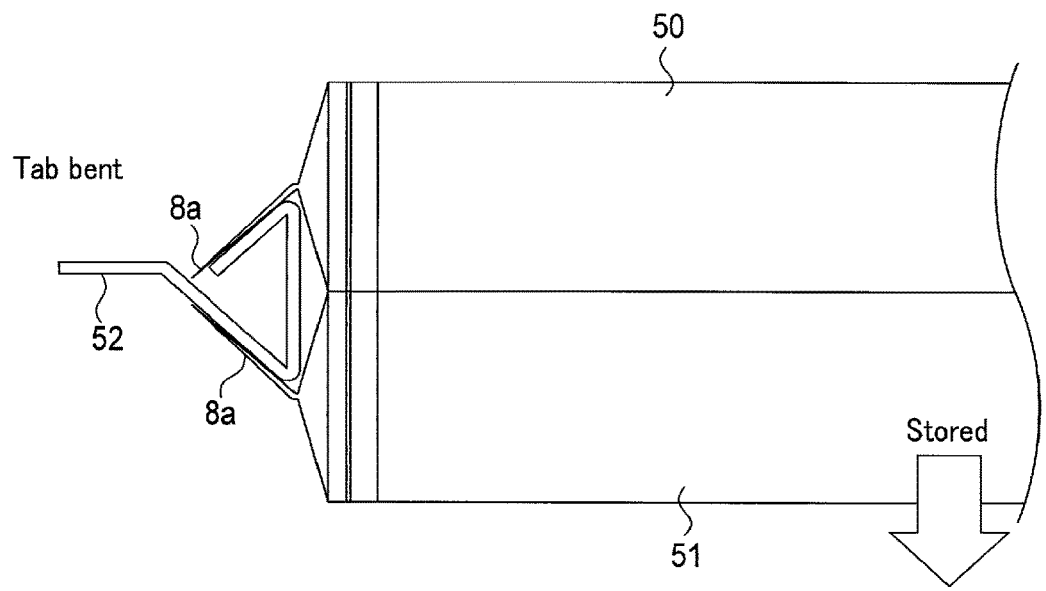
F I G. 11B

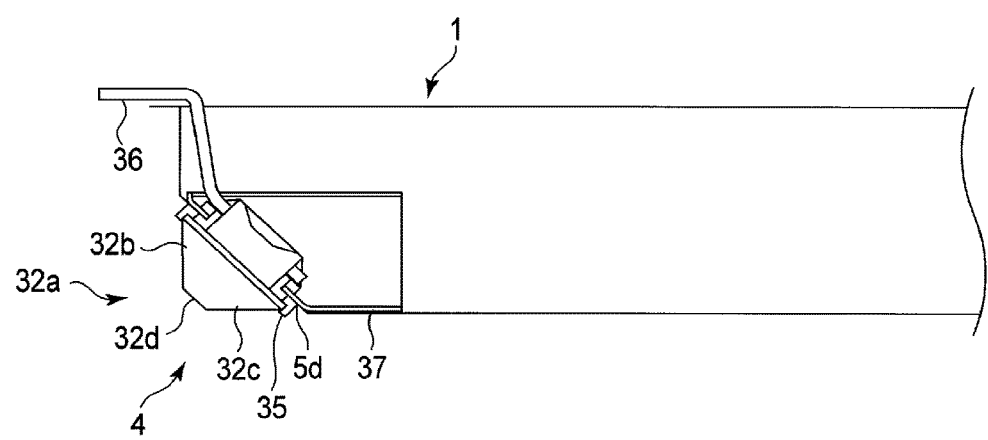
F I G. 11C

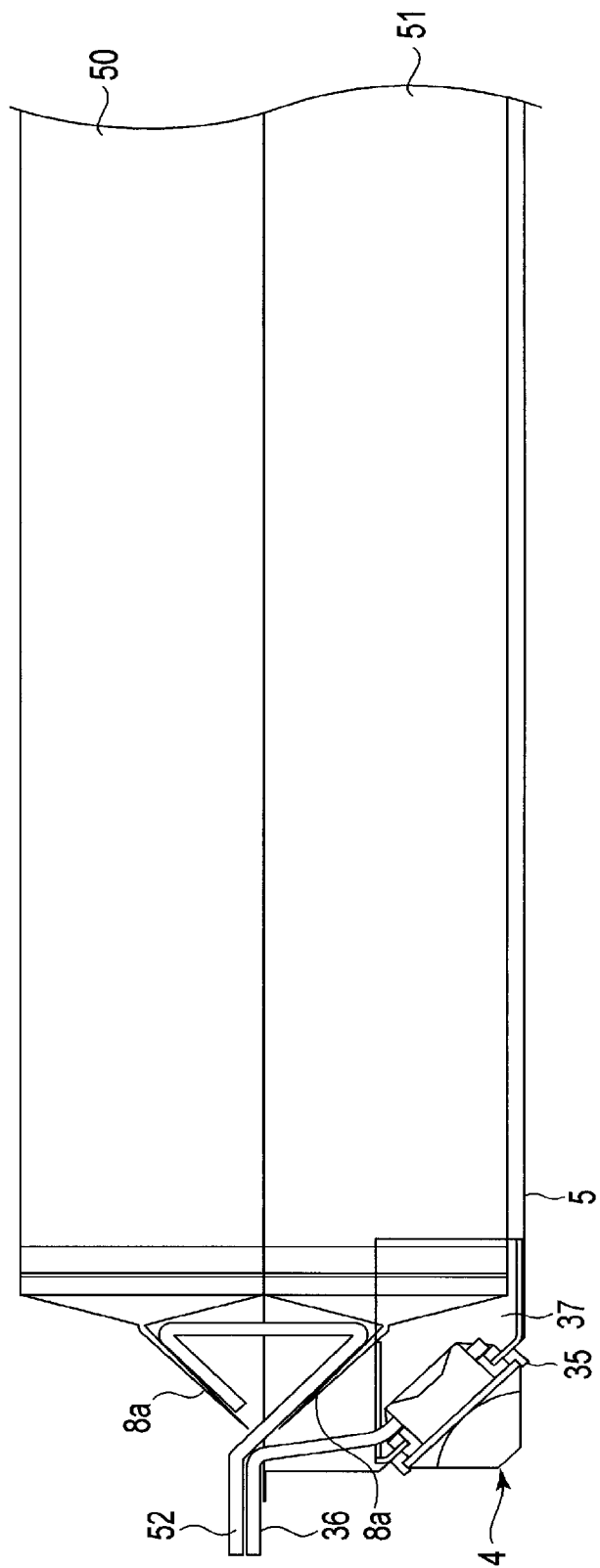

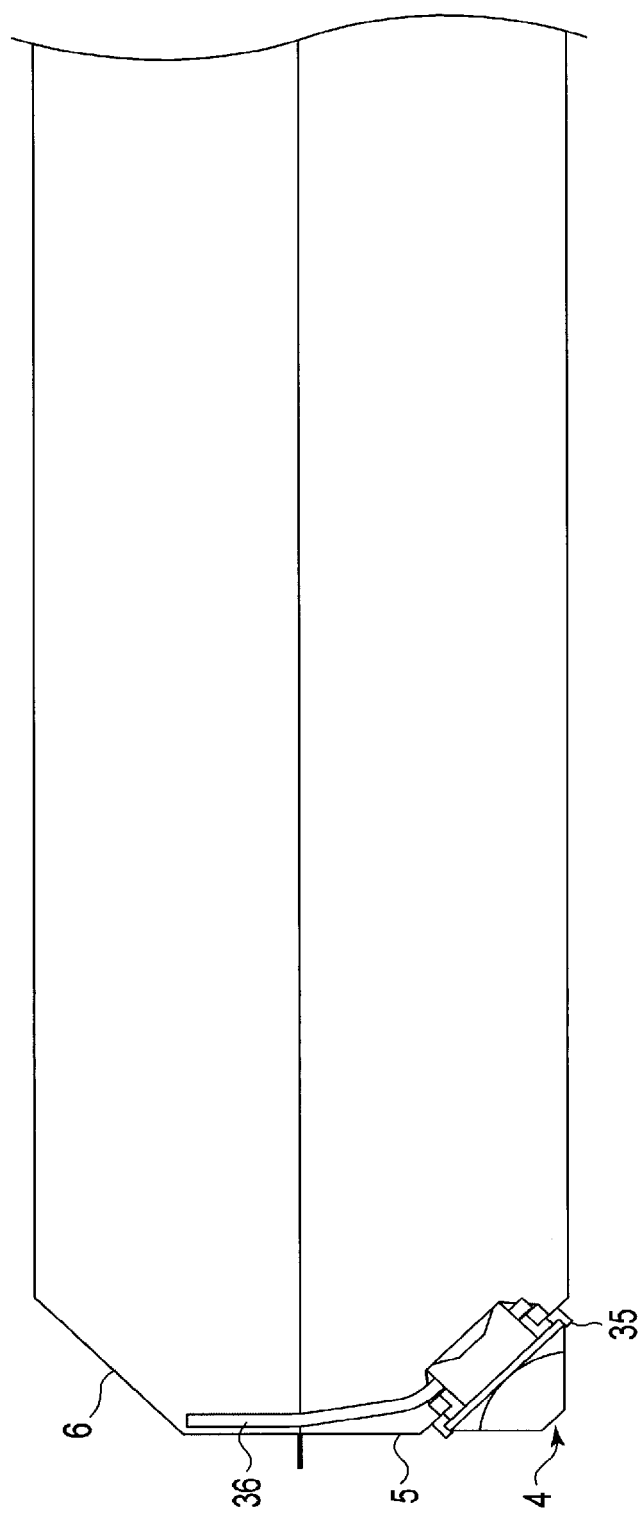

BATTERY AND BATTERY PACK

CROSS-REFERENCE TO RELATED APPLICATIONS

This application is a Continuation Application of PCT Application No. PCT/JP2016/067686, filed Jun. 14, 2016 and based upon and claiming the benefit of priority from Japanese Patent Application No. 2015-120466, filed Jun. 15, 2015, the entire contents of all of which are incorporated herein by reference.

FIELD

The embodiment of the present invention relates to a battery and a battery pack.

BACKGROUND

A battery, such as a primary battery and a secondary battery, generally includes an electrode group having a positive electrode and a negative electrode, and a package member for storing the electrode group.

A metal can and a laminated film-made container have been commercially used as a package member. A metal can is formed by deep-drawing processing of a metal plate of aluminum, etc. To form a can by deep-drawing processing, a metal plate needs to have a certain thickness; however, this is an obstacle to reducing a thickness of a package, and leads to a loss in volume and capacity. For example, if a package can having a plate the plate thickness in total to the thickness of the battery is 7.7%. Since a package has high rigidity but less flexibility, a gap is often generated between the inner wall of a package can and an electrode group. As a consequence, a gap between a positive electrode and a negative electrode in the electrode group may lead to degradation of a charge-and-discharge cycle. Furthermore, a package with high rigidity is inclined to have defects, such as cracking, when an excess force is applied to the vicinity of a welded portion.

However, because a portion of a laminated film-made container that is sealed by heat sealing may melt at a high temperature, its reliability is insufficient.

Also, the manufacturing costs for both a package can and a laminated film-made container are high.

Under such circumstances, it has been requested to provide a package with an improvement in thickness reduction and flexibility, and with excellent reliability at low manufacturing costs.

BRIEF DESCRIPTION OF DRAWINGS

FIG. 2 is an exploded perspective view of the battery shown in FIG. 1.

FIG. 5A is a sectional view of the portion A in FIG. 1 when the portion is cut along the long-side direction of the battery.

FIG. 9A is a plan view of a second package.

FIG. 9B is a plan view of a first package.

FIG. 10A is a three-plane drawing showing a step of manufacturing the battery according to the first embodiment.

FIG. 10B is a three-plane drawing showing a step of manufacturing the battery according to the first embodiment.

FIG. 10C is a three-plane drawing showing a step of manufacturing the battery according to the first embodiment.

FIG. 10D is a three-plane drawing showing a step of manufacturing the battery according to the first embodiment.

FIG. 11A is a schematic drawing showing a step of electrically connecting current collector tabs of a plural of electrode groups.

FIG. 11B is a schematic drawing showing a step of electrically connecting current collector tabs of a plural of electrode groups.

FIG. 11C is a sectional view of the vicinity of the terminal section of the first package when the vicinity is cut along the long-side direction of the battery.

FIG. 12A is a schematic drawing showing a step of assembling the battery according to the first embodiment, including a plural of electrode groups.

FIG. 12B is a schematic drawing showing a step of assembling the battery according to the first embodiment, including a plural of electrode groups.

DETAILED DESCRIPTION

A problem to be solved by the invention is to provide a battery and a battery pack that can achieve thickness reduction and improved flexibility, includes a package member that excels at reliability, and can reduce manufacturing costs.

According to one embodiment, a battery includes a flat-shaped electrode group, a package member and a terminal section. The electrode group includes a positive electrode, a positive electrode current collector tab electrically connected to the positive electrode, a negative electrode, and a negative electrode current collector tab electrically connected to the negative electrode. The positive electrode current collector tab is wound into a flat shape and located at a first edge surface. The negative electrode current collector tab is wound into a flat shape and located at a second edge surface. The package member includes a stainless steel-made first package having a flange at an opening and a stainless steel-made second package. The electrode group is stored in a space formed by welding the flange of the first package to the second package. The terminal section includes a through-hole that is open to the first package, a ring-shaped rising portion that extends from a periphery of the through-hole toward an inside of the package member, a ring-shaped member that is arranged on an outer surface of the rising portion, an insulation gasket that has a cylindrical portion to be inserted into the rising portion. The terminal section further includes an external terminal. The external terminal includes a head portion and a shank portion extending from the head portion. The external terminal is fixed to the first package by caulking with the head portion projecting to an outside of the first package and the shank portion being inserted into a cylindrical portion of the insulation gasket. The external terminal is electrically connected to the positive electrode or the negative electrode.

Embodiments will be described below with reference to the drawings. The same structures will be referenced by the same numbers and symbols throughout the embodiments, and overlapping descriptions will be omitted. Each drawing is a schematic drawing to aid understanding of the embodiments and the descriptions thereof. Shapes, dimensions, and ratios presented therein may be different from those of the actual apparatus; however, they may be appropriately changed as a design choice in consideration of the following descriptions and publicly-known techniques.

First Embodiment

A battery according to the first embodiment will be explained with reference to FIG. 1 to FIG. 12.

Figure 1:
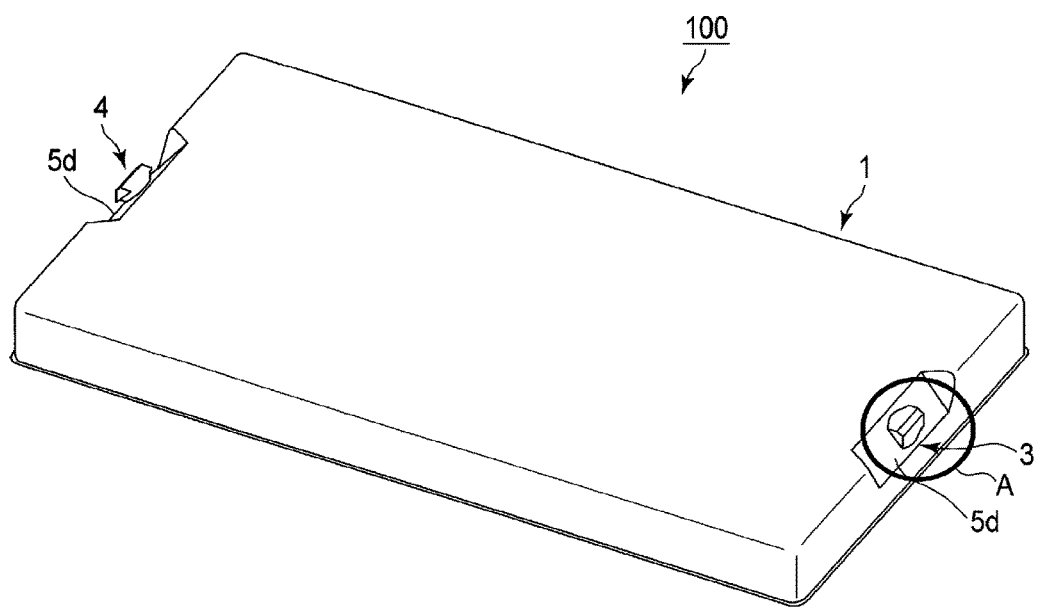
FIG. 1 is a perspective view of an outline of a battery according to a first embodiment.

The battery 100 shown in FIG. 1 is a nonaqueous electrolyte battery. The battery 100 includes a package member 1, an electrode group 2, a positive electrode terminal 3, a negative electrode terminal 4, and a nonaqueous electrolyte (not shown).

As shown in FIGS. 1 and 2, the package member 1 includes a first package 5 and a second package 6. The first package 5 is a bottomed square cylindrical container made of stainless steel, and has a flange 5b at its opening 5a. As shown in FIGS. 1, 2, and 5A, a reentrant portion toward the inner side is provided near the center of the corner connecting the short-side side wall and the bottom of the first package 5, and the bottom of the reentrant portion, constitutes an inclined surface 5d. The first package 5 has a depth equal to or shorter than the size of the opening 5a (a maximum length of the area constituting the opening). More preferably, the first package 5 has a depth equal to or shorter than the short side of the area constituting the opening (as shown in FIG. 2 for example). The first package 5 is manufactured by shallow-drawing processing of a stainless-steel plate, for example. On the other hand, the second package 6 is a rectangular plate made of stainless steel. An electrode group 2 is stored in a space formed by welding the flange 5b of the first package 5 to the four sides of the second package 6. For welding, resistance seam welding is used, for example. Compared to laser welding, resistance seam welding can realize high air-tightness and heat resistance at a low cost.

Figure 4:
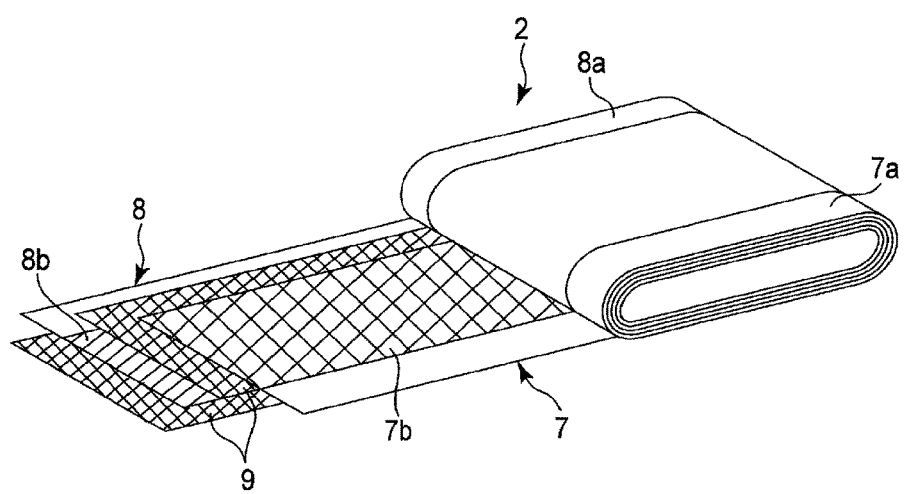
FIG. 4 is a partially-developed perspective view of the electrode group.

The electrode group 2 has a flat shape as shown in FIG. 4, and includes a positive electrode 7, a negative electrode 8, and a separator 9 provided between the positive electrode 7 and the negative electrode 8. The positive electrode 7 includes a band-shaped positive electrode current collector made of, for example, a foil, a positive electrode current collector tab 7a consisting of one edge portion parallel to the long side of the positive electrode current collector, and a positive electrode material layer 7b (a layer containing a positive electrode active material) formed on the positive electrode current except for at least positive electrode current collector tab 7a. A negative electrode 8 includes a band-shaped negative electrode made of, for example, a foil, a negative electrode current collector tab 8a consisting of one edge portion parallel to the long side of the negative electrode current collector, and a negative electrode material layer 8b (a layer containing a negative electrode active material) formed in the negative electrode current collector except for at least negative electrode current collector tab 8a.

The electrode group 2 is produced by winding the positive electrode 7, the separator 9, and the negative electrode 8 into a flat shape, in such a manner that the positive electrode material layer 7b of the positive electrode 7 and the negative electrode material layer 8b of the negative electrode 8 face each other with the separator 9 being interposed therebetween, and the positive electrode current collector tab 7a projects further to one side of the winding axis than the negative electrode 8 and the separator 9 project, and the negative electrode current collector tab 8a projects further to the other side than the positive electrode 7 and the separator 9. Thus, in the electrode group 2, the positive electrode current collector tab 7a that is spirally wound into a flat shape is located at a first edge surface perpendicular to the winding axis. The negative electrode current current collector tab 8a that is spirally wound into a flat shape is located at a second edge surface perpendicular to the winding axis. The insulating sheet 10 covers a portion in the outermost surface of the electrode group 2, except for the positive electrode current current collector tab 7a and the negative electrode current current collector tab 8a. The electrode group 2 contains a nonaqueous electrolyte (not shown).

The backup positive electrode lead 11 (the third positive electrode lead) is a conductive plate folded into a U shape to bring the vicinity of the center of the layers of the positive electrode current collector tab 7a into tight contact with each other, except for the curved portion at both ends of the positive electrode current collector tab 7a. The electrode group side positive electrode lead 12 (the second positive electrode lead) is a conductive plate having an area larger than the backup positive electrode lead 11. As shown in FIG. 5A, the electrode group side positive electrode lead 12 is connected to a surface of the backup positive electrode lead 11. The surface of the backup positive electrode lead 11 faces the opening side of the first package 5. The positive electrode current collector tab 7a, the backup positive electrode lead 11, and the electrode group side positive electrode lead 12 are integrated by welding, thereby electrically connecting the positive electrode 7 to the electrode group side positive electrode lead 12 via the positive electrode current collector tab 7a and the backup positive electrode lead 11. The welding is, for example, ultrasonic welding.

The backup negative electrode lead 13 (the third negative electrode lead) is a conductive plate folded into a U shape to bring the vicinity of the center of the layers of the negative electrode current collector tab 8a into tight contact with each other with a portion except for the curved portion at both ends of the negative electrode current collector tab 8a. The electrode group side negative electrode lead 14 (the second negative electrode lead) is a conductive plate having an area larger than the backup negative electrode lead 13. The electrode group side negative electrode lead 14 is connected to a surface of the backup negative electrode lead 13. The surface of the backup negative electrode lead 13 faces the opening side of the first package 5. The negative electrode current current collector tab 8a, the backup negative electrode lead 13, and the electrode group side negative electrode lead 14 are integrated by welding, thereby electrically connecting the negative electrode 8 to the electrode group side negative electrode lead 14 via the negative electrode current collector tab 8a and the backup negative electrode lead 13. The welding is, for example, ultrasonic welding.

As shown in FIGS. 2, 5A, 5B, and 7, the positive electrode terminal 3 includes a through-hole 15 (a first through-hole) that is open to the inclined surface 5d of the first package 5, a burring portion 16 (a first burring portion), a positive electrode external terminal 17, a ring-shaped member 18 (a first ring-shaped member), an insulation gasket 19 (a first insulating gasket), and a positive electrode terminal insulating member 20 (a third positive electrode insulating member).

Figure 7:
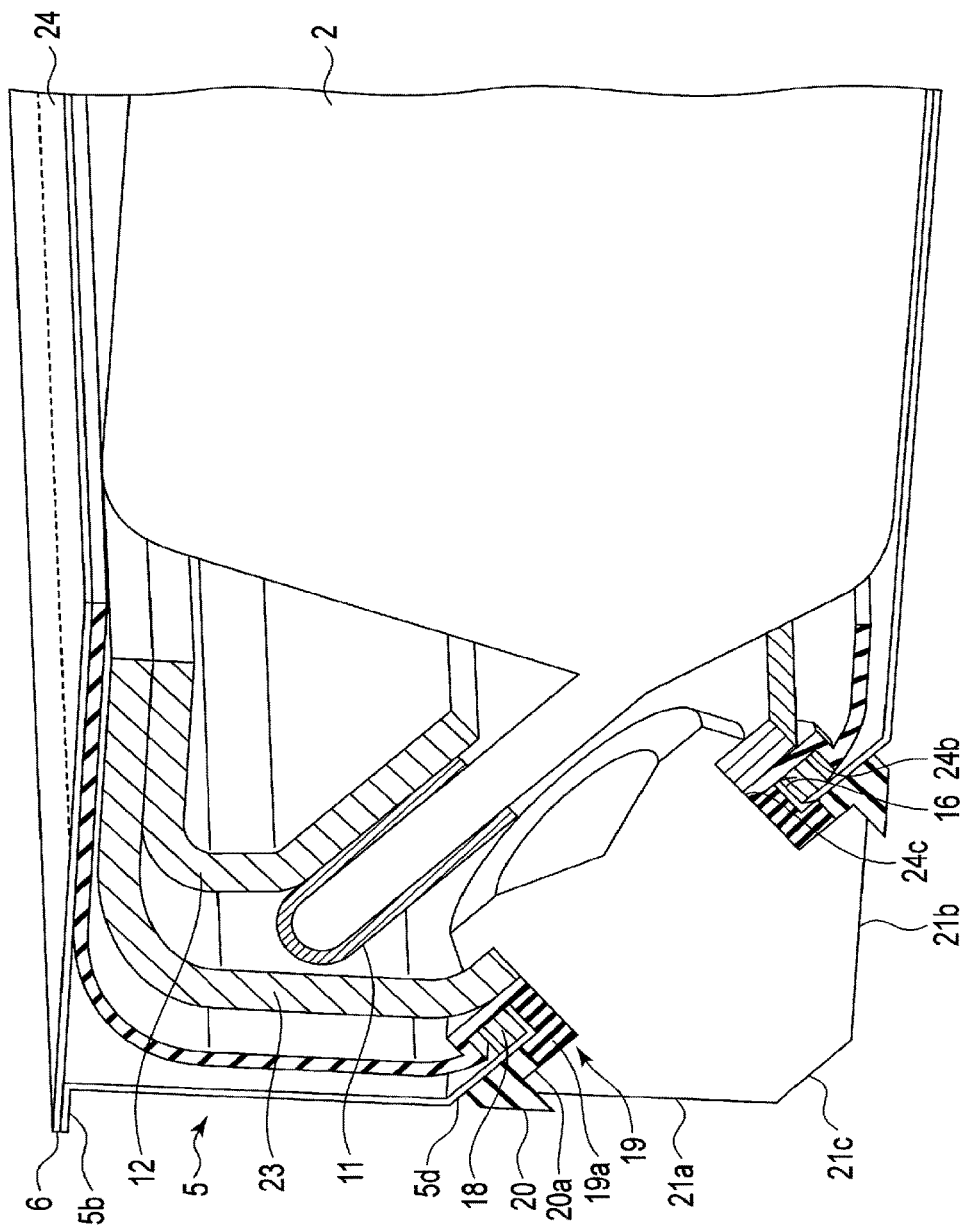
FIG. 7 is a perspective view of the portion A in FIG. 1 when the portion is cut along the long-side direction of the battery.

The burring portion 16 (a ring-shaped rising portion) extends from the periphery of the through-hole 15 toward the inside of the package member 1 as shown in FIGS. 5A and 7, and is formed by burring processing.

Figure 6:
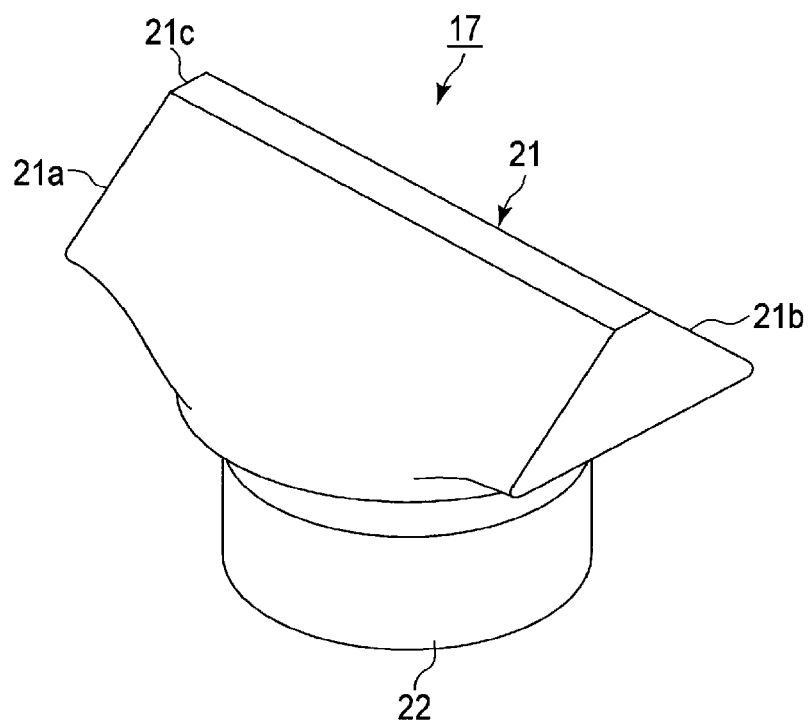
FIG. 6 is a perspective view showing an outline of an external terminal of the battery shown in FIG. 1.

The positive electrode external terminal 17 includes a head portion 21 having a shape of a truncated rectangular prism, and a shank portion 22 having a cylindrical shape, as shown in FIG. 6. The head portion 21 has two lateral surfaces 21a and 21b (first and second inclined surfaces) and a top surface 21c which has a rectangular shape and connects the two lateral surfaces 21a and 21b. The shank portion 22 in a cylindrical shape extends from a plane that is parallel to the top surface 21c of the head portion 21. The positive electrode external terminal 17 is made of a conductive material, such as aluminum or an aluminum alloy.

The ring-shaped member 18 consists of a circular ring made of a material harder than the gasket, for example. Examples of a material harder than the gasket include stainless steel, plated steel (e.g., plated with Ni or NiCr, etc.), ceramics, and a resin harder than a gasket, (e.g., polyphenylene sulfide (PPS), and polybutylene terephthalate (PBT)). The ring-shaped member 18 is arranged on the outer circumference surface of the burring portion 16 and is in contact with the burring portion 16, as shown in FIGS. 5A and 7.

If the ring-shaped member 18 is made of an insulating material, such as a resin or ceramics, it may be integrated with the terminal insulation reinforcement member 24.

As shown in FIG. 7, the insulation gasket 19 has a cylindrical body (cylindrical portion) having a flange 19a at one opening edge of the insulation gasket 19. As shown in FIGS. 5A and 7, the cylindrical portion of the insulation gasket 19 is inserted into the through-hole 15 and the burring portion 16, and the flange 19a is arranged at the outer periphery of the through-hole 15 on the outer surface of the first package 5. The insulation gasket 19 is made of a resin, such as a fluororesin, a fluororubber, a polyphenylenesulfide resin (a PPS resin), a polyetheretherketone resin (a PEEK resin), a polypropylene resin (a PP resin), or a polybutylene terephthalate resin (a PBT resin).

Figure 5B:
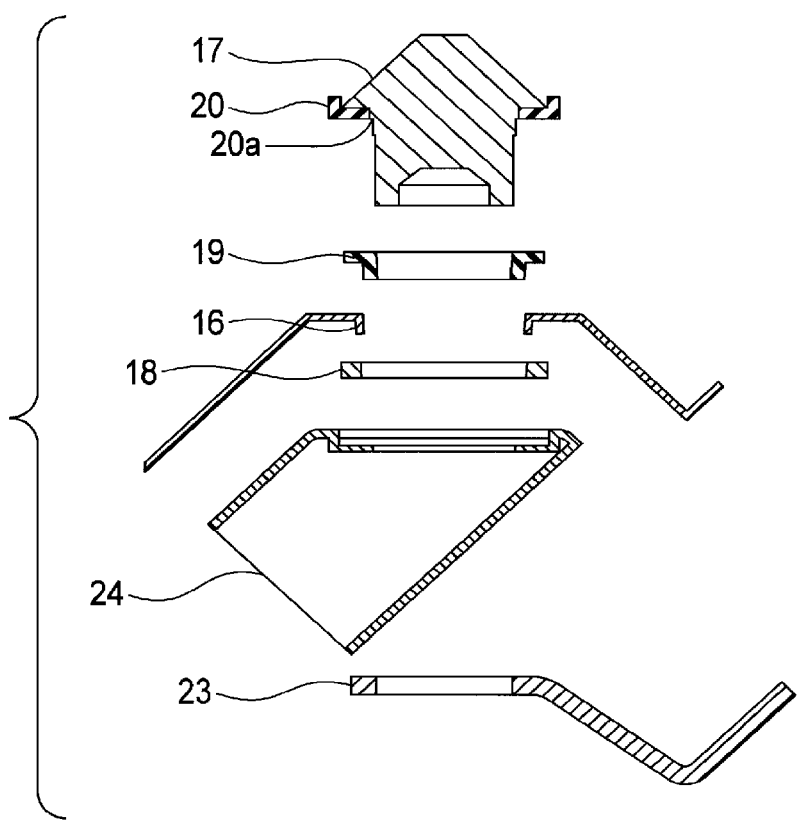
FIG. 5B is an exploded view of a terminal section in the portion A in FIG. 1.

The positive electrode terminal insulating member 20 (the third positive electrode insulating member) is a bottomed square cylindrical body and has a through-hole 20a on its bottom, as shown in FIG. 5B. The positive electrode terminal insulating member 20 is arranged on the outer surface of the first package 5. The flange 19a of the insulation gasket 19 is inserted into the through-hole 20a of the positive electrode terminal insulating member 20, as shown in FIG. 7.

The positive electrode terminal 3 may further include a positive electrode terminal lead 23 (a first positive electrode lead). The positive electrode terminal lead 23 is a conductive plate having a through-hole 23a.

If the positive electrode terminal 3 includes the positive electrode terminal lead 23, the positive electrode terminal 3 may further include the positive electrode terminal insulation reinforcement member 24 (a first positive electrode insulating member). As shown in FIG. 2, the positive electrode terminal insulation reinforcement member 24 has a main body 24a having a structure of a longitudinally half-divided bottomed rectangular cylinder, a circle groove 24b formed in the main body 24a, and a through-hole 24c that is open in the center of the circle groove 24b. The positive electrode terminal insulation reinforcement member 24 covers a corner portion where the main body 24a continues from the short-side side wall of the first package 5 to the bottom surface and a corner portion where the main body 24a continues from the short-side side surface of the first package 5 to the long-side side wall. The first package 5, particularly the corner and the vicinity thereof where the short-side side wall, the long-side side wall, and the bottom cross each other, is thereby reinforced. The ring-shaped member 18, which is arranged on the outer circumference surface of the burring portion 16, is arranged in the circle groove 24b. The through-hole 24c communicates with the opening of the burring portion 16 and the through-hole 15 of the first package 5. The positive electrode terminal lead 23 is arranged on the positive electrode terminal insulation reinforcement member 24. The through-hole 23a of the positive electrode terminal lead 23 communicates with the through-hole 24c of the positive electrode terminal insulation reinforcement member 24, the opening of the burring portion 16, and the through-hole 15 of the first package 5.

After the shank portion 22 is inserted into the insulation gasket 19, the through-hole 20a of the positive electrode terminal insulating member 20, the through-hole 15 of the first package 5, the burring portion 16, the ring-shaped member 18, the through-hole 24c of the positive electrode terminal insulation reinforcement member 24, and the through-hole 23a of the positive electrode terminal lead 23, plastic deformation occurs in the shank portion 22 of the positive electrode external terminal 17 by caulking. As a result, these members are integrated, and the positive electrode external terminal 17 is electrically connected to the positive electrode terminal lead 23. Thus, the positive electrode external terminal 17 also serves as a rivet. The boundary of the edge surface of the shank portion 22 of the positive electrode external terminal 17 and the through-hole 23a of the positive electrode terminal lead 23 is welded by a laser, etc., to achieve a firmer connection and improvement of electric conductivity.

As shown in FIG. 2, the negative electrode terminal 4 includes a through-hole 30 (a second through-hole) that is open to the inclined surface 5d of the first package 5, a burring portion 31 (a second burring portion), a negative electrode external terminal 32, a ring-shaped member 33 (a second ring-shaped member), an insulation gasket 34 (a second insulating gasket), and a negative electrode terminal insulating member 35 (a third negative electrode insulating member). These members have structures similar to those explained in relation to the positive electrode terminal 3.

The burring portion 31 (a ring-shaped rising portion) extends from the periphery of the through-hole 30 toward the inside of the package member 1, and is formed by burring processing.

The negative electrode external terminal 32 includes a head portion 32a having a shape of a truncated rectangular prism as shown in FIG. 11C, and a shank portion having a cylindrical shape. The head portion 32a has two lateral surfaces 32b and 32c (first and second inclined surfaces) and a top surface 32d which has a rectangular shape and connects the two lateral surfaces 32b and 32c. The shank portion in a cylindrical shape extends from a plane that is parallel to the top surface of the head portion 32a. The negative electrode external terminal 32 is made of a conductive material, such as aluminum or an aluminum alloy.

The ring-shaped member 33 consists of a circular ring made of a material harder than the gasket, for example. Examples of a material harder than the gasket include stainless steel, plated steel (e.g., plated with Ni or NiCr, etc.), ceramics, and a resin harder than a gasket, (e.g., polyphenylene sulfide (PPS), and polybutylene terephthalate (PBT)). The ring-shaped member 33 is arranged on the outer circumference surface of the burring portion 31.

If the ring-shaped member 33 is made of an insulating material, such as a resin or ceramics, it may be integrated with the terminal insulation reinforcement member 37.

The insulation gasket 34 has a cylindrical body having a flange at one opening edge of the insulation gasket 34. The cylindrical portion of the insulation gasket 34 is inserted into the through-hole 30 and the burring portion 31, and the flange is arranged in the outer periphery of the through-hole 30 on the outer surface of the first package 5. Examples of the material of the insulation gasket 34 are similar to those explained for the positive electrode terminal 3.

The negative electrode terminal insulating member 35 (the third negative electrode insulating member) is a bottomed square cylindrical body and has a through-hole 35a on its bottom, as shown in FIG. 2. The negative electrode terminal insulating member 35 is arranged on the outer surface of the first package 5. The flange of the insulation gasket 34 is inserted into the through-hole 35a of the negative electrode terminal insulating member 35.

The negative electrode terminal 4 may further include a negative electrode terminal lead 36 (a first negative electrode lead). The negative electrode terminal lead 36 is a conductive plate having a through-hole 36a.

If the negative electrode terminal 4 includes the negative electrode terminal lead 36, the negative electrode terminal 4 may further include the negative electrode terminal insulation reinforcement member 37 (a first negative electrode insulating member). As shown in FIG. 2, the negative electrode terminal insulation reinforcement member 37 has a main body 37a having a structure of a longitudinally half-divided bottomed rectangular cylinder, a circle groove 37b formed in the main body 37a, and a through-hole 37c that is open in the center of the circle groove 37b. The negative electrode terminal insulation reinforcement member 37 covers a corner portion where the main body 37a continues from the short-side side wall of the first package 5 to the bottom surface and a corner portion where the main body 37a continues from the short-side side wall of the first package 5 to the long-side side wall. The first package 5, particularly the corner and the vicinity thereof where the short-side side wall, the long-side side wall, and the bottom cross each other, is thereby reinforced. The ring-shaped member 33, which is arranged on the outer circumference surface of the burring portion 31, is arranged in the circle groove 37b. The through-hole 37c communicates with the opening of the burring portion 31 and the through-hole 30 of the first package 5. The negative electrode terminal lead 36 is arranged on the negative electrode terminal insulation reinforcement member 37. The through-hole 36a of the negative electrode terminal lead 36 communicates with the through-hole 37c of the negative electrode terminal insulation reinforcement member 37, the opening of the burring portion 31, and the through-hole 30 of the first package 5.

Figure 8:
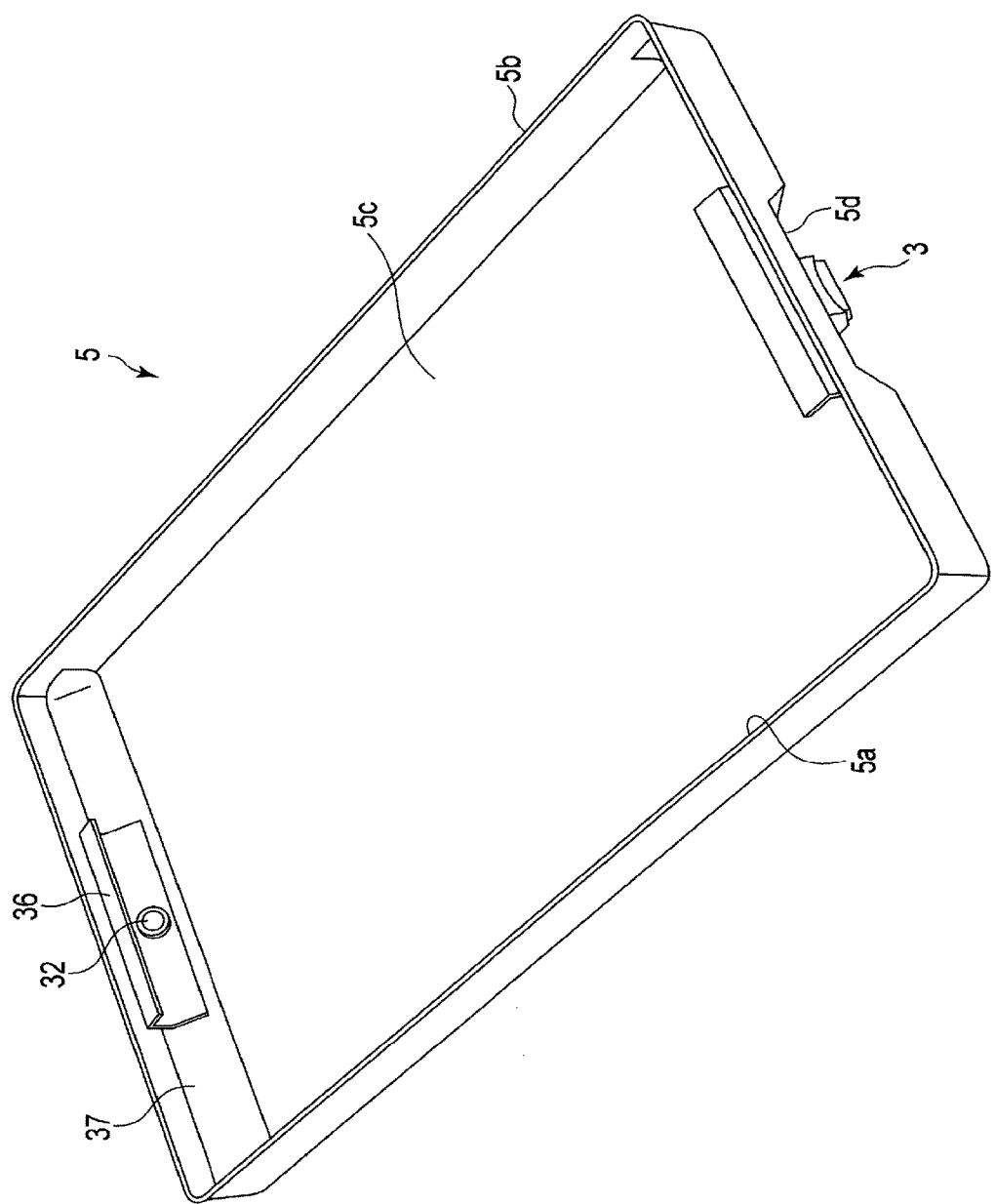
FIG. 8 is a perspective view of a first package of the battery shown in FIG. 1 when the terminal section is stationarily fixed to the first package.

After the shank portion is inserted into the insulation gasket 34, the through-hole 35a of the negative electrode terminal insulating member 35, the through-hole 30 of the first package 5, the burring portion 31, the ring-shaped member 33, the through-hole 37c of the negative electrode terminal insulation reinforcement member 37, and the through-hole 36a of the negative electrode terminal lead 36, plastic deformation occurs in the shank portion of the negative electrode external terminal 32 by caulking. As a result, as shown in FIG. 8, these members are integrated, and the negative electrode external terminal 32 is electrically connected to the negative electrode terminal lead 36. Thus, the negative electrode terminal 36 also serves as a rivet. The boundary of the edge surface of the shank portion of the negative electrode external terminal 32 and the through-hole 36a of the negative electrode terminal lead 36 is welded by a laser, etc., to achieve a firmer connection and improvement of electric conductivity.

As shown in FIG. 2, each of a pair of the second insulation reinforcement members 38 has a structure of a longitudinally half-divided bottomed rectangular cylinder. One second insulation reinforcement member 38 covers almost half the positive electrode current collector tab 7a from the center of the winding to the second package 6 side. The other second insulation reinforcement member 38 covers almost half the negative electrode current collector tab 8a from the center of the winding to the second package 6 side. The second package 6, particularly the vicinity of the short sides, is thereby reinforced.

The first to third positive electrode leads and the first to third negative electrode leads may be made of aluminum or an aluminum alloy, for example. To reduce contact resistance, a material of the lead is preferably the same as the material of the positive electrode current collector or the negative electrode current collector that may be in electrical contact with the lead.

The first to third positive electrode insulating members, the first to third negative electrode insulating members, and the insulation reinforcement member are made of a thermoplastic resin, such as a tetrafluoroethylene perfluoroalkyl vinylether copolymer (PFA), polypropylene (PP), polyethylene (PE), nylon, polybutylene terephthalate (PBT), polyethylene terephthalate (PET), polytetrafluoroethylene (PTFE), polyphenylene sulfide (PPS), or polyetheretherketone (PEEK).

The electrode group 2 is stored in the first package 5 in such a manner that the first edge surface 7a faces the positive electrode terminal 3 and the second edge surface 8a faces the negative electrode terminal 4. For this reason, the plane that intersects the first edge surface 7a and the second edge surface 8a of the electrode group 2 faces the bottom surface 5c in the first package 5, and the curved surface that intersects the first edge surface 7a and the second edge surface 8a faces the long-side side surface in the first package 5.

In the corner portion that connects the short-side side wall of the first package 5 with the bottom, there are a gap between the corner and the first edge surface 7a of the electrode group 2 and a gap between the corner and the second edge surface 8a of the electrode group 2. A reentrant portion projecting inside of the corner portion which connects the short-side side wall of the first package 5 with the bottom is provided, and the bottom surface of the reentrant portion is made as an inclined surface 5d, so that the dead space in the first package 5 is decreased, thereby increasing volume energy density of the battery. By arranging the positive electrode terminal 3 and the negative electrode terminal 4 in each inclined surface 5d, it is possible to increase an area where the terminal section is arranged, compared to arranging the positive electrode terminal 3 and the negative electrode terminal 4 in the short-side side surface that does not have an inclined surface. Thus, it becomes possible to increase the diameter of the shank portion 22 of the positive electrode external terminal 17 and the shank portion of the negative electrode external terminal 32, thereby supplying a large current at low resistance (a high-rate current).

As a result of storing the electrode group 2 in the first package 5, the positive electrode current collector tab 7a is covered by a bottomed rectangular cylindrical cover, which is formed by bringing the lower edge of the second insulation reinforcement member 38 into contact with the upper edge of the first positive electrode insulating member 24. The negative electrode current collector tab 8a is covered by a bottomed rectangular cylindrical cover, which is formed by bringing the lower edge of the second insulation reinforcement member 38 into contact with the upper edge of the first positive electrode insulating member 37.

The second package 6 functions as a lid of the first package 5. The electrode group 2 is sealed inside the package member 1 by welding the flange 5b of the first package 5 to the four sides of the second package 6.

The above-described nonaqueous electrolyte battery shown in FIGS. 1 to 8 includes a package member wherein the electrode group is stored in a space formed by welding the stainless steel-made first package having a flange at its opening to a stainless steel-made second package. Since the first package and the second package are made of stainless steel, it is possible to maintain high strength when the plate thickness of the first and second packages is reduced. As a result, since flexibility of the package members can be improved, it becomes easier to bind the electrode group by vacuum sealing or by adding a load from the outside of the package members. Thus, as a distance between electrodes in the electrode group becomes stable, allowing resistance to be decreased, a battery pack having resistance to vibration and to impact can be thereby easily realized. If the first and second packages have high flexibility, it becomes easy to shorten a distance from the inner surface of the first and second packages to the electrode group, thereby improving thermal radiation efficiency of the battery.

The stainless steel-made first and second packages are easy to be welded, and can be sealed by resistance seam welding, which can be carried out at a low cost. Thus, a package member with hermetic sealing higher than that of a laminated film-made container can be realized at a low cost. Thermal resistance properties of the package member can also be improved. For example, the melting point of SUS304 is 1400° C., whereas that of aluminum is 650° C.

Plastic deformation in the shank portion of the external terminal is caused by fixing the shank portion at the through-hole by caulking. As a result, force is applied to the insulation gasket in a diameter direction; however, since the rising portion is reinforced by the ring-shaped member arranged at the outer periphery of the rising portion, compressional stress is caused in the insulation gasket, and the external terminal can be connected to the first package at high strength. Since the rising portion can be reinforced by the ring-shaped member even if the plate thickness of the first package, in other words, the plate thickness of the rising portion, is decreased, it is possible to connect the external terminal to the first package with high strength, regardless of a plate thickness of the first package. Furthermore, since the rising portion extends from the periphery portion of the through-hole toward the inside of the package member, the action of the outer pressure can prevent liquid leakage when an inner pressure in the package member is increased due to a gas, etc. High reliability can thus be realized when the plate thickness of the first and second packages are decreased.

Therefore, according to the battery of the first embodiment, since high strength and reliability can be achieved even when the plate thickness of the first and second packages are reduced; it is possible to provide a battery with excellent flexibility and thermal radiation property and high strength and reliability.

If the first package has a depth equal to or longer than a maximum length of the opening, the opening area of the first package becomes larger. Since the second package is welded to the four sides of the first package, the larger the opening area becomes, the longer the length of a side to be welded becomes; thus, it is easy to inject an electrolyte from a gap in one side after the other three sides are welded first. Furthermore, the package member can be temporarily sealed by a portion having less welding strength, thereby negating a need of parts for temporary sealing, such as a rubber stopper. Furthermore, the flat shape of the package member improves thermal radiation of the battery.

Since the first package includes a reentrant portion having an inclined surface, thereby arranging a terminal section in the inclined surface, the dead space in the first package can be decreased, and an external terminal with a large diameter for its shank portion becomes usable; thus, a large current at low resistance (a high-rate current) can be supplied.

The inclined portion is not limited to an element that is provided near the center of the short side of the package member; it may stretch over the entire short side of the package member.

The terminal section desirably further includes a first lead which is electrically connected to an external terminal to electrically connect the first lead to the positive electrode tab or the negative electrode current collector tab. Positioning becomes easier using the first lead, compared to a case where the positive electrode tab or the negative electrode current collector tab is directly connected to the external terminal. Productivity can be thus improved. The first lead is connected to the external terminal by caulking, thereby reducing resistance between the first lead and the external terminal.

An insulating member that reinforces the first package is arranged between the first lead and the inner surface of the first package, thereby insulating the first lead from the first package while reinforcing the first package. Such an insulation member is effective for reducing the thickness of the package member.

It is further desirable to include a second lead that is electrically connected to the positive electrode tab or the negative electrode current collector tab, and to electrically connect the second lead to the first lead. Positioning when welding is performed becomes thereby easier. Since a sufficient area for connecting can be provided even when the position of the first lead with respect to the positive electrode tab or the negative electrode current collector tab is displaced, a battery with low resistance can be realized.

The first edge surface of the external terminal has a square-shaped top surface, and first and second inclined surfaces continuing to two opposite sides of the top surface; thus, the welding direction can be changed by selecting one of the three surfaces as a welding surface.

The plate thickness of each of the first and second packages preferably falls under the range from 0.02 mm to 0.3 mm. The range can balance conflicting properties, i.e., mechanical strength and flexibility. The more preferable range of the plate thickness is the range from 0.05 mm to 0.15 mm.

It is desirable that a difference (thickness) between the outer diameter and the inner diameter of the ring-shaped member of either or each of the positive electrode terminal and the negative electrode terminal is the same or larger than the plate thickness of the first package. Thus, the external terminal can be connected to the first package with high strength, regardless of the plate thickness of the first package. More specifically, the thinnest plate thickness may be 0.1 mm or thicker.

Furthermore, the outer shape of the ring-shaped member is not necessarily similar to the cross-sectional shape of the burring; rather, it may be a polyhedral shape, such as a rectangle or a hexagon, and may have a composite shape consisting of a single or multiple curved lines and a single or multiple straight lines.

A flat plate, like the one illustrated in FIGS. 5A and 5B, may be used for the second package; however, a package having a flange at its opening may be used instead of a flat plate. Examples of such a structure include a package having a structure similar to that of the first package.

The backup positive electrode lead 11 (the third positive electrode lead) and the backup negative electrode lead 13 (the third negative electrode lead) are not limited to a U-shaped conductive plate, and a conductive flat plate may be used. A structure not using one of the backup positive electrode lead 11 and the backup negative electrode lead 13, or both of them, is also possible.

The package member may further include a safety valve for releasing a pressure inside the battery when the inner pressure rises higher than a predetermined value.

The battery according to the first embodiment may be a primary battery or a secondary battery. An example of the battery according to the first embodiment may be a lithium ion secondary battery.

Next, the positive electrode, the negative electrode, the separator, and the nonaqueous electrolyte of the battery according to the first embodiment will be described below.

1) Positive Electrode

A positive electrode may include, for example, a positive electrode current collector, a positive electrode material layer held by the positive electrode current collector, and a positive electrode current collector tab. The positive electrode material layer may include, for example, a positive electrode active material, a conductive agent, and a binder.

As a positive electrode active material, an oxide or a sulfide may be used, for example. Examples of an oxide and a sulfide include manganese dioxides ($MnO_2$) that absorbs lithium, iron oxides, copper oxides, nickel oxides, lithium-manganese composite oxides (for example, $Li_xMn_2O_4$ or $Li_xMnO_2$), lithium-nickel composite oxides (for example, $Li_xNiO_2$), lithium-cobalt composite oxides (for example, $Li_xCoO_2$), lithium-nickel-cobalt composite oxides (for example, $Li_xNi_{1-y}Co_yO_2$), lithium-manganese-cobalt composite oxides (for example, $Li_xMn_yCo_{1-y}O_2$), lithium-manganese-nickel composite oxides having a spinel strucure (for example, $Li_xMn_{2-y}Ni_yO_4$), lithium phosphate oxides having an olivine strucure (for example, $Li_xFePO_4$, $Li_xFe_{1-y}Mn_yPO_4$, $Li_xCoPO_4$), iron sulfates ($Fe_2(SO_4)_3$), vanadium oxides (for example, $V_2O_5$), and lithium-nickel cobalt-manganese composite oxide. In the above formulas, $0<x\leq1$ and $0<y\leq1$. As an active material, one of these compounds or a combination thereof may be used.

The binder is combined to bind the active material and the current collector. Examples of the binder include polytetrafluoroethylene (PTFE), polyvinylidene fluoride (PVdF), and fluororubber.

The conductive agent is combined, if necessary, in order to enhance the current collecting performance, and to reduce the contact resistance between the active material and the current collector. Examples of the conductive agent include carbonaceous materials, such as acetylene black, carbon black, and/or graphite.

In the positive electrode material layer, the positive electrode active material and the binder are preferably mixed respectively in proportions of: 80 mass % to 98 mass %; and 2 mass % to 20 mass %.

The amount of the binder is adjusted to 2 mass % or more, thereby providing sufficient electrode strength. The amount of the binder is adjusted to 20 mass % or less, thereby decreasing the amount of the binder contained as an insulating material in the electrode and decreasing internal resistance.

In a case of adding the conductive agent, the positive electrode active material, the binder, and the conductive agent are preferably mixed respectively in proportions of: 77 mass % to 95 mass %; 2 mass % to 20 mass %; and 3 mass % to 15 mass %. The amount of the conductive agent is adjusted to 3 mass % or more, thereby achieving the above-described effect. The amount of the conductive agent is adjusted 15 mass % or less, thereby reducing the decomposition of the nonaqueous electrolyte on the surface of the conductive agent under high-temperature storage.

An aluminum foil, or an aluminum alloy foil including at least one element selected from a group of Mg, Ti, Zn, Ni, Cr, Mn, Fe, Cu, and Si is preferably used for the positive electrode current collector.

The positive electrode current collector is preferably integrated with the positive electrode tab. Or, the positive electrode current collector may be different from the positive electrode current collector tab.

2) Negative Electrode

A negative electrode may include, for example, a negative electrode current collector, a negative electrode material layer held by the negative electrode current collector, and a negative electrode current collector tab. The negative electrode material layer may include, for example, a negative electrode active material, a conductive agent, and a binder.

As a negative electrode active material, a metal oxide, a metal nitride, an alloy, or a carbon which can allow lithium ions to be intercalated in and released from, for example, can be used. A material which capable of allowing lithium ions to be intercalated and released at the potential of 0.4 V (vs $Li/Li^+$) or more is preferably used as a negative electrode active material.

The conductive agent is mixed in order to enhance the current collecting performance, and to reduce the contact resistance between the negative electrode active material and the current collector. Examples of the conductive agent include carbonaceous materials, such as acetylene black, carbon black, and/or graphite.

The binder is mixed to fill a gap among dispersed negative electrode active materials and to bind the active material and the current collector. Examples of the binder include polytetrafluoroethylene (PTFE), polyvinylidene fluoride (PVdF), and fluororubber, and styrene-butadiene rubber.

The active material, the conductive agent, and the binder in the negative electrode material layer are preferably mixed respectively in proportions of: 68 mass % to 96 mass %; 2 mass % to 30 mass %; and 2 mass % to 30 mass %. The amount of the conductive agent is adjusted to 2 mass % or more, thereby improving the current collecting performance of the negative electrode layer. The amount of the binder is adjusted to 2 mass % or more, thereby achieving sufficient binding between the negative electrode material layer and the current collector, and expecting excellent cycle characteristics. On the other hand, it is preferable to adjust each of the conductive agent and the binder to 28 mass % or less to achieve larger capacity.

As a current collector, a material that is electrochemically stable in an intercalating potential and a releasing potential of lithium in the negative electrode active material is used. Copper, nickel, stainless steel, or aluminum, or an aluminum alloy foil including at least one element selected from a group of Mg, Ti, Zn, Mn, Fe, Cu, and Si is preferably used for the current collector. The thickness of the current collector preferably falls within the range from 5 to 20 μm. The current collector having such a thickness can balance strength and light weight for the negative electrode.

The negative electrode current collector is preferably integrated with the negative electrode current collector tab. Or, the negative electrode current collector may be different from the negative electrode current collector tab.

The negative electrode is prepared, for example, by suspending a negative electrode active material, a conductive agent, and a binder in an appropriate solvent to prepare slurry, applying the slurry to the current collector, drying the slurry to obtain a negative electrode material layer, and performing a press. The negative electrode may be formed by arranging on the current collector a negative electrode material layer, which is obtained by forming the negative electrode active material, the binder, and the conductive agent into a pellet shape.

3) Separator

A separator may be made of, for example, a porous film including polyethylene, polypropylene, cellulose, or polyvinylidene fluoride (PVdF), or a nonwoven cloth made of a synthesis resin. Particularly, a porous film made of polyethylene or polypropylene melts at a certain temperature to break a current, thereby improving safety.

4) Electrolyte

As an electrolytic solution, an nonaqueous electrolyte solution can be used, for example.

A nonaqueous electrolyte may be, for example, a liquid nonaqueous electrolyte prepared by dissolving an electrolyte in an organic solvent, or a gel nonaqueous electrolyte which is a composite of a liquid electrolyte and a polymer material.

The liquid nonaqueous electrolyte is prepared by, for example, dissolving an electrolyte in a concentration from 0.5 mol/L to 2.5 mol/L in an organic solvent.

Examples of the electrolyte dissolved in the organic solvent include lithium salts, for example, lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bis(trifluoromethylsulphonyl)imide [$LiN(CF_3SO_2)_2$], etc., and any mixtures thereof. An electrolyte is preferably resistant to oxidizing even under a high potential, and $LiPF_6$ is most preferable.

Examples of an organic solvent include: cyclic carbonate, such as propylene carbonate (PC), ethylene carbonate (EC), or vinylene carbonate; chain carbonate, such as diethyl carbonate (DEC), dimethyl carbonate (DMC), or methyl ethyl carbonate (MEC); cyclic ether, such as tetrahydrofuran (THF), 2-methyltetrahydrofuran (2MeTHF), and dioxolane (DOX); cyclic ether, such as dimethoxyethane (DME), and diethoxyethane (DEE); γ-butyrolactone (GEL), acetonitryl (AN), and sulfolane (SL). These organic solvents may be used individually or mixed.

Examples of polymer materials include polyvinylidene fluoride (PVdF), polyacrylonitrile (PAN), and polyethylene oxide (PEO).

Or, as a nonaqueous electrolyte, a room temperature molten salt (ionic melts) containing lithium ions, a polymer solid electrolyte, an inorganic solid electrolyte, etc., may be used.

Of organic salts including organic cations and anions, a room temperature molten salt (ionic melts) is a compound that may exist as a liquid under a room temperature (15 to 25° C.). Examples of a room temperature molten salt include a room temperature molten salt that exists as a liquid by itself, a room temperature molten salt that converts into a liquid if mixed with an electrolyte, and a room temperature molten salt that converts into a liquid when dissolved in an organic solvent. Generally, the melting point of a room temperature molten salt that is used for a nonaqueous electrolyte battery is 25° C. or lower. Organic cations generally have a quaternary ammonium skeleton.

A method of manufacturing a battery of the first embodiment will be described below.

Figure 3:
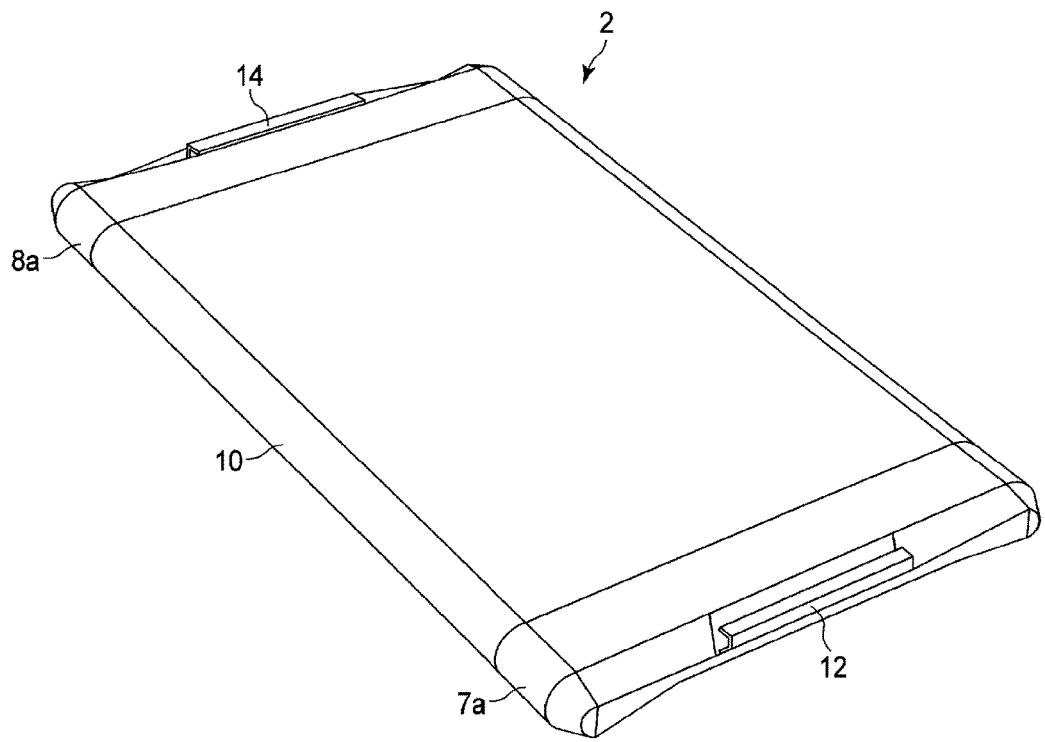
FIG. 3 is a perspective view of an electrode group of the battery shown in FIG. 1.

An electrode group 2 with an insulating sheet 10 as illustrated in FIG. 3 is formed. A first package 5, in which a positive electrode terminal 3 and a negative electrode terminal 4 are stationarily fixed as illustrated in FIG. 8, is formed. At least one guide hole used for positioning is made in each of the first package 5 and a second package 6. An example is shown in FIGS. 9A and 9B. FIG. 9A shows an example where the guide holes 39 are made in the four corners of the second package 6. FIG. 9B shows an example where the guide holes 39 are made in the four corners of the first package 5.

The electrode group 2 is stored in a first package 5, an electrode group side positive electrode lead 12 is welded to a positive electrode terminal lead 23, and an electrode side negative electrode lead 14 is welded to a negative electrode terminal lead 36. For the welding, laser welding is used, for example.

Subsequently, the positive electrode current collector tab 7a and the negative electrode current collector tab 8a of the electrode group 2 are covered by a pair of second insulation reinforcement members 38. Then, the second package 6 is arranged on the first package 5. Since the guide holes 39 are open at the four corners of each of the first package 5 and the second package 6, it is easy to determine a position of the second package 6 with respect to the first package 5.

Subsequently, the three sides of each of the first package 5 and the second package 6 (for example, one long side and two short sides) are welded, as shown in FIG. 10A. For welding, resistance seam welding is used, for example. The welded portion is indicated by reference number 40. The welded portion 40 is desirably located further inside than the outer periphery of the first package 5 and the second package 6.

After injecting an electrolyte from the opening at the unwelded side, this side is welded by, for example, resistance seam welding, as shown in FIG. 10B. The welded portion 41 is desirably located at the outer periphery of the first package 5 and the second package 6.

Next, after performing aging and initial charging/discharging, a part 42 is cut off from the welded portion 41 as shown in FIG. 10C, so that a gas inside the package member is ejected. Thereafter, as shown in FIG. 10D, the portion further inside than the welded portion 41 is welded by, for example, resistance seam welding. This welding is desirably performed under a vacuum atmosphere.

After that, the guide holes 39 may be removed as needed by cutting off the vicinity of the outer periphery of the first package 5 and the second package 6. The guide holes 39 may remain.

It is thus possible to manufacture a battery of the first embodiment by the above-described method at high productivity.

The battery of the first embodiment may include a plural of electrode groups in one package member. In this case, a package having a flange at its opening, similar to the first package, is desirably used as the second package.

If a plural of electrode groups are stored in one package member, the electrode groups may be connected in series or in parallel. FIGS. 11A to 11C show examples of the plural of electrode groups connected in parallel. As illustrated in FIG. 11A, the first electrode group 50 is laminated on the second electrode group 51 so that the negative electrode current collector tab 8*a* of the first electrode group 50 is electrically connected to the negative electrode current collector tab 8*a* of the second electrode group 51 by the fourth negative electrode lead 52, and the positive electrode tab 7*a* of the first electrode group 50 is electrically connected to the positive electrode tab 7*a* of the second electrode group 51 by the fourth positive electrode lead (not shown). Subsequently, as shown in FIG. 11B, the negative electrode current collector tabs 8*a* of the first and second electrode groups 50 and 51 are bent inward, as needed. The positive electrode current collector tabs 7*a* are bent in a similar manner. Thereafter, as shown in FIG. 11C, the first and second electrode groups 50 and 51 are stored inside the first package 5 in which the positive electrode terminal 3 and the negative electrode terminal 4 are stationarily fixed. Subsequently, as shown in FIG. 12A, the fourth negative electrode lead 52 is welded to the negative electrode terminal lead 36. The fourth positive electrode lead is welded to the positive electrode terminal lead 23. After the above-described process, manufacturing of the battery shown in FIG. 12B is completed. The fourth positive electrode lead and the fourth negative electrode lead can be made of a material similar to those listed for the first to third positive electrode leads and negative electrode leads.

The above-described battery of the first embodiment includes a package member in which an electrode group is stored in a space formed by welding a stainless steel-made first package having a flange at its opening to a stainless steel-made second package. The battery includes a terminal section that includes a through-hole that is open to the first package, a ring-shaped rising portion that extends from the periphery portion of the through-hole toward the inside of the package member, a ring-shaped member that is arranged on the outer surface of the rising portion, an insulation gasket that has a cylindrical portion to be inserted into the rising portion, and an external terminal that is fixed to the first package by caulking, with its head portion projecting to the outside of the first package and its axial portion being inserted into the cylindrical portion of the insulation gasket. Therefore, it is possible to provide a battery with excellent flexibility and thermal radiation properties, and high strength and reliability.

The terminal section may be applied to both of or either one of the positive electrode terminal section and the negative electrode terminal section.

Second Embodiment

The battery pack according to the second embodiment includes at least one battery of the first embodiment. An example of a battery module including the battery according to the first embodiment is shown in FIGS. 13 and 14.

Figure 13:
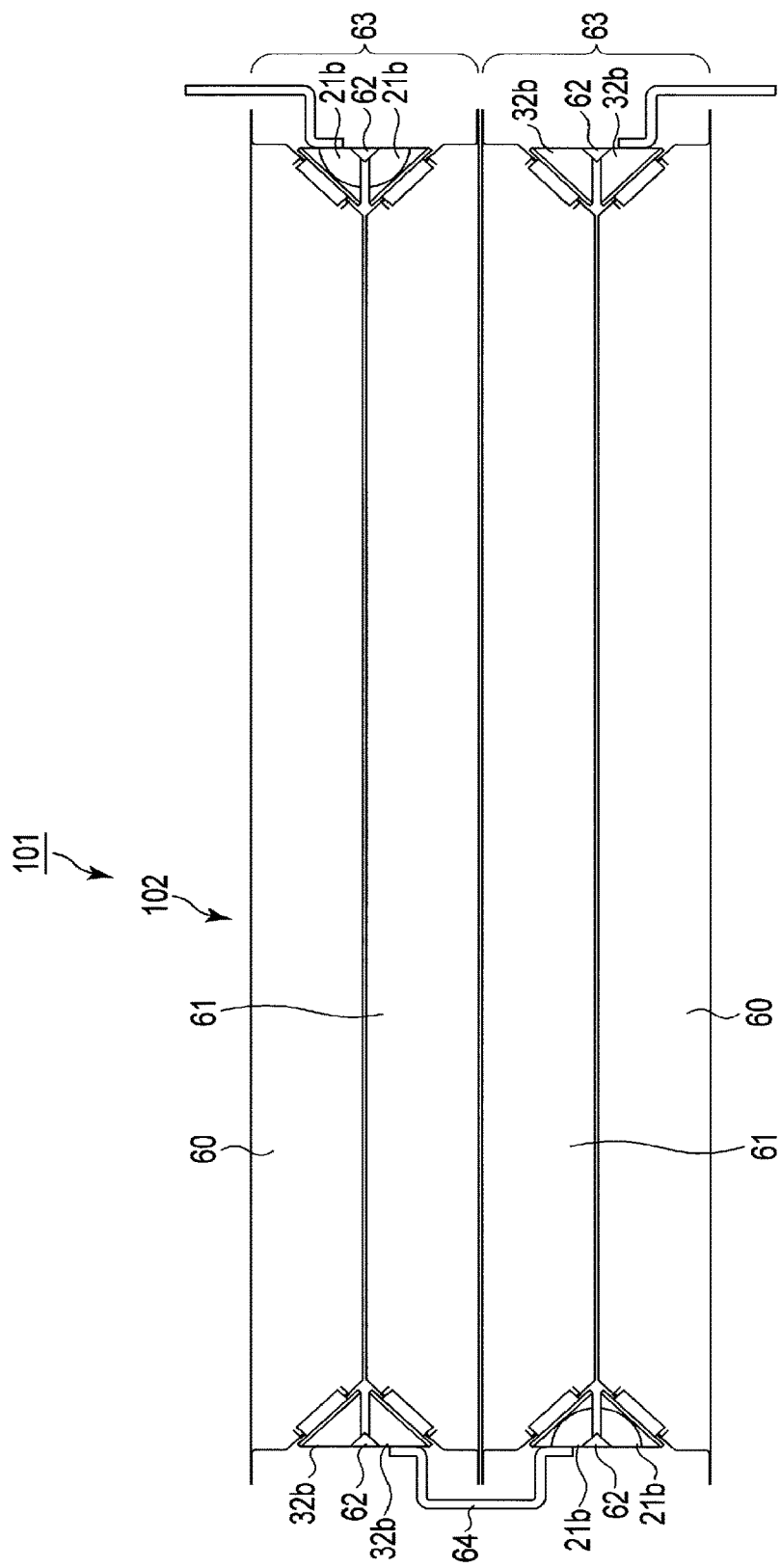
FIG. 13 is a schematic diagram showing a first example of a battery pack according to a second embodiment.

As shown in FIG. 13, the battery pack 101 includes a battery module 102 including the battery 100 of the first embodiment as a single battery. A conductive coupling member 62 having a shape of a triangular prism is arranged between the top surface 32*b* of the negative electrode external terminal 32 of the first single battery 60, which serves as the battery 100, and the top surface of the negative electrode external terminal 32*b* of the second single battery 61. A conductive coupling member 62 having a shape of triangular prism is arranged between the top surface 21*b* of the positive electrode external terminal 17 of the first single battery 60 and the top surface 21*b* of the positive electrode external terminal 17 of the second single battery 61. The conductive coupling member 62 is electrically connected to each of the two top surfaces by welding. As the welding, for example, laser welding, arc welding, or resistance welding may be used. Thus, a battery module unit 63 in which the first single battery 60 and the second single battery 61 are connected in parallel is obtained. The battery module 102 is obtained by connecting the battery module units 63 in series by bus-bars 64.

Figure 14:
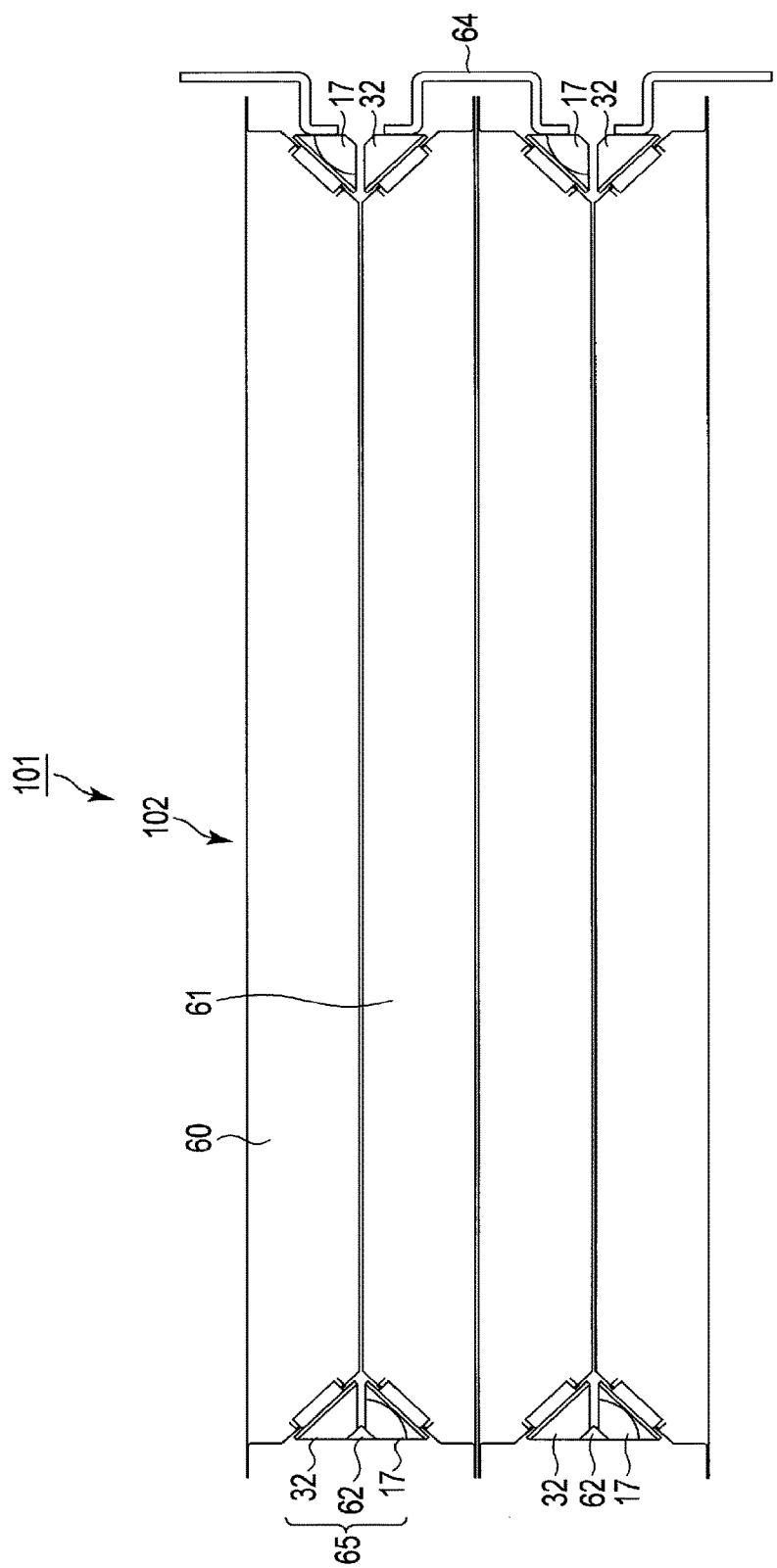
FIG. 14 is a schematic diagram showing a second example of the battery pack according to the second embodiment.

The battery pack 101 shown in FIG. 14 includes a battery module 102 including the battery 100 of the first embodiment as a single battery. The first single battery 60 and the second single battery 61 serve as the battery 100, and constitute a battery module unit 65. The second single battery 61 is connected to the first single battery 60 in series by the conductive coupling member 62. The battery module 102 is obtained by connecting the battery module units 65 by bus-bars 64. A method of electrically connecting the first single battery 60 and the second single battery 61 using the conductive coupling member 62 is the same as the method described with reference to FIG. 13.

In the battery module shown in FIGS. 13 and 14, the neighboring first single battery 60 and second single battery 61 are laminated with their main surfaces of the package members 1 facing each other. In the battery module units 63 shown in FIG. 13, for example, the main surface of the first package 5 of the first single battery 60 faces the main surface of the first package 5 of the second single battery 61. In the neighboring battery module unit 63, the main surface of the second package 6 of the second single battery 61 of one battery module unit 63 faces the main surface of the second package 6 of the second single battery 61 of the other battery module unit 63. The batteries are thus laminated with their main surfaces of the package members facing each other, thereby increasing volume energy density of the battery module.

It is desirable to provide an insulating space between the single battery 60 and the single battery 61, between the single batteries 60, or between the single batteries 61, as shown in FIGS. 13 and 14, and a gap of 0.03 mm or wider may be provided, or an insulating member (for example, a resin, such as polypropylene, polyphenylene sulfide, or epoxy, or fine ceramics, such as alumina or zirconium dioxide) may be provided between the cells.

Since each of the positive electrode external terminal 17 and the negative electrode external terminal 32 has a head portion having a shape of a truncated rectangular prism, the external terminal of the single battery can be connected to one of the two portions (for example, first and second inclined surfaces) of the head portion, that is, the first inclined surface, and a bus-bar can be connected to the other portion, that is, the second inclined surface. In other words, a two-direction connection is realized in one head portion. As a result, a path electrically connecting the batteries can be shortened, thereby supplying a large current at low resistance to a battery pack.

Since the battery pack according to the second embodiment includes at least one battery of the first embodiment, it is possible to provide a battery pack that can achieve a reduction in thickness and improved flexibility, reliability, and can reduce manufacturing costs.

The battery pack is used as a power supply of electronic devices and vehicles (railway vehicles, cars, motor bicycles, light vehicles, trolley buses, etc.), for example.

As described above, the battery module may include a plural of batteries that are electrically connected in series, in parallel, or both in series and in parallel. A battery pack may include a circuit, such as a battery control unit (BMU), etc., in addition to a battery module, and a circuit illustrated in a structure (e.g., a vehicle) to which the battery module is installed may be used as a battery control unit. The battery control unit has a function of monitoring either one of or both of a voltage and a current of a single battery and a battery module to prevent over-charge and over-discharge.

A battery according to at least one above-described embodiment includes a package member in which an electrode group is stored in a space formed by welding a first package that is made of stainless steel and has a flange at its opening to a second package that is made of stainless steel. The battery includes a terminal section that includes a ring-shaped rising portion that extends from the periphery portion of a through-hole that is open to the first package toward the inside of the package member, a ring-shaped member that is arranged on the outer surface of the rising portion, and an external terminal. Therefore, it is possible to provide a battery with excellent flexibility and thermal radiation property, and high strength and reliability.

While certain embodiments have been described, these embodiments have been presented by way of example only, and are not intended to limit the scope. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A battery comprising:
   a flat-shaped electrode group that includes a positive electrode, a positive electrode current collector tab electrically connected to the positive electrode, a negative electrode, and a negative electrode current collector tab electrically connected to the negative electrode, the positive electrode current collector tab being wound into a flat shape and located at a first edge surface, and the negative electrode current collector tab being wound into a flat shape and located at a second edge surface;
   a package member that includes a stainless steel-made first package having a flange at an opening and a stainless steel-made second package, and that stores the electrode group in a space formed by welding the flange of the first package to the second package; and
   a terminal section that includes a through-hole that is open to the first package, a ring-shaped rising portion that extends from a periphery of the through-hole toward an inside of the package member, a ring-shaped member that is arranged on an outer surface of the rising portion, an insulation gasket that has a cylindrical portion to be inserted into the rising portion, and an external terminal that includes a head portion and a shank portion extending from the head portion, the external terminal being fixed to the first package by caulking with the head portion projecting to an outside of the first package and the shank portion being inserted into the cylindrical portion of the insulation gasket, and the external terminal being electrically connected to the positive electrode or the negative electrode.

2. The battery according to claim 1, wherein
   the first package includes a reentrant portion having an inclined surface, and the through-hole is open to the inclined surface.

3. The battery according to claim 2, wherein
   the terminal section further includes a first lead having a through-hole,
   the shank portion of the external terminal is inserted into the through-hole of the first lead and fixed to the first package and the first lead by caulking, and
   the first lead is electrically connected to the positive electrode current collector tab or the negative electrode current collector tab.

4. The battery according to claim 3, further comprising a first insulation reinforcement member that is arranged between the first lead and an inner surface of the first package to reinforce the first package, and a second insulation reinforcement member that covers at least part of an inner surface of the second package to reinforce the second package.

5. The battery according to claim 3, further comprising a second lead that is electrically connected to the positive electrode current collector tab or the negative electrode current collector tab, the second lead being electrically connected to the first lead.

6. The battery according to claim 2, wherein
   the head portion of the external terminal has a square-shaped top surface, and first and second inclined surfaces coupled to two sides of the top surface, the two sides being opposite to each other.

7. The battery according to claim 2, wherein
   a plate thickness of each of the first package and the second package falls under a range from 0.02 mm to 0.3 mm.

8. The battery according to claim 2, wherein
   the welding is resistance seam welding.

9. The battery according to claim 1, wherein
   an inclined surface is provided in a corner portion where a side wall and a bottom of the first package cross, and
   the through-hole is open to the inclined surface.

10. The battery according to claim 1, wherein
    the terminal section includes a positive electrode external terminal that is electrically connected to the positive electrode, and a negative electrode external terminal that is electrically connected to the negative electrode.

11. The battery according to claim 1,
    wherein the battery comprises a plural of the electrode groups.

12. A battery pack comprising the battery according to claim 1.

13. The battery pack according to claim 12, wherein
    the battery pack comprises a battery module in which a plural of the batteries are electrically connected.

14. The battery pack according to claim 13, wherein
    in the plural of the batteries, the head portion of the external terminal has a square-shaped top surface, and first and second inclined surfaces coupled to two sides of the top surface, the two sides being opposite to each other,
    the plural of the batteries are stacked, and the first inclined surface or the second inclined surface of the external terminal of one of the batteries that are neighboring is electrically connected to the first inclined surface or the second inclined surface of the external terminal of another battery.

15. The battery pack according to claim 14, further comprising a coupling member that is arranged between the first inclined surface or the second inclined surface of the external terminal of the one of the batteries, and the first inclined surface or the second inclined surface of the external terminal of the another battery.

* * * * *